United States Patent
Cosenza

(10) Patent No.: US 6,186,717 B1
(45) Date of Patent: Feb. 13, 2001

(54) ELECTRICAL TERMINAL BLIND GROUNDING STUD FASTENER SYSTEM

(75) Inventor: Frank J. Cosenza, Santa Barbara, CA (US)

(73) Assignee: Fairchild Holding Corp, Dulles, VA (US)

(*) Notice: Under 35 U.S.C. 154(b), the term of this patent shall be extended for 0 days.

(21) Appl. No.: 09/301,029

(22) Filed: Apr. 28, 1999

(51) Int. Cl.[7] .................................................. F16B 13/04
(52) U.S. Cl. ................................. 411/43; 411/34; 411/69
(58) Field of Search ........................... 174/40 CC, 153 R, 174/153 G, 157, 158 R, 163 R, 167, 168, 169; 411/34–38, 43, 69, 70

(56) References Cited

U.S. PATENT DOCUMENTS

| | | | |
|---|---|---|---|
| 2,785,219 | * 3/1957 | Rudner | 411/43 |
| 3,030,705 | * 4/1962 | Gill | 411/43 |
| 3,515,419 | * 6/1970 | Baugh | 411/43 |
| 3,948,142 | * 4/1976 | McKay et al. | 411/37 |
| 4,907,922 | * 3/1990 | Jeal et al. | 411/43 |
| 4,967,463 | * 11/1990 | Pratt | 411/37 |
| 4,969,785 | * 11/1990 | Wright | 411/43 |
| 5,599,147 | * 2/1997 | Luhm | 411/38 |
| 5,618,142 | * 4/1997 | Sonden et al. | 411/43 |
| 5,733,086 | * 3/1998 | Jakob | 411/34 |
| 5,993,129 | * 11/1999 | Sato | 411/43 |

* cited by examiner

Primary Examiner—Kristine Kincaid
Assistant Examiner—Adolfo Nino
(74) Attorney, Agent, or Firm—Christie, Parker & Hale, LLP

(57) ABSTRACT

A fastener system including a blind grounding stud and a sleeve. The sleeve has a first section abutting a second section. The first section has a smaller outer surface diameter than the second section. A knurled band is formed around the first section beginning at the intersection between the first and second sections. The sleeve has an opening axially through the two sections. The opening has a first larger inner surface which tapers via a frusto-conical surface to a smaller diameter inner surface. The larger diameter inner surface extends from the free end of the sleeve first section and extends toward the second section to the frusto-conical surface. The smaller diameter inner surface begins at the free end of the second section and extends toward the first section to the frusto-conical inner surface. The smaller diameter inner surface spans at least a portion and preferably all of the knurled band.

22 Claims, 2 Drawing Sheets

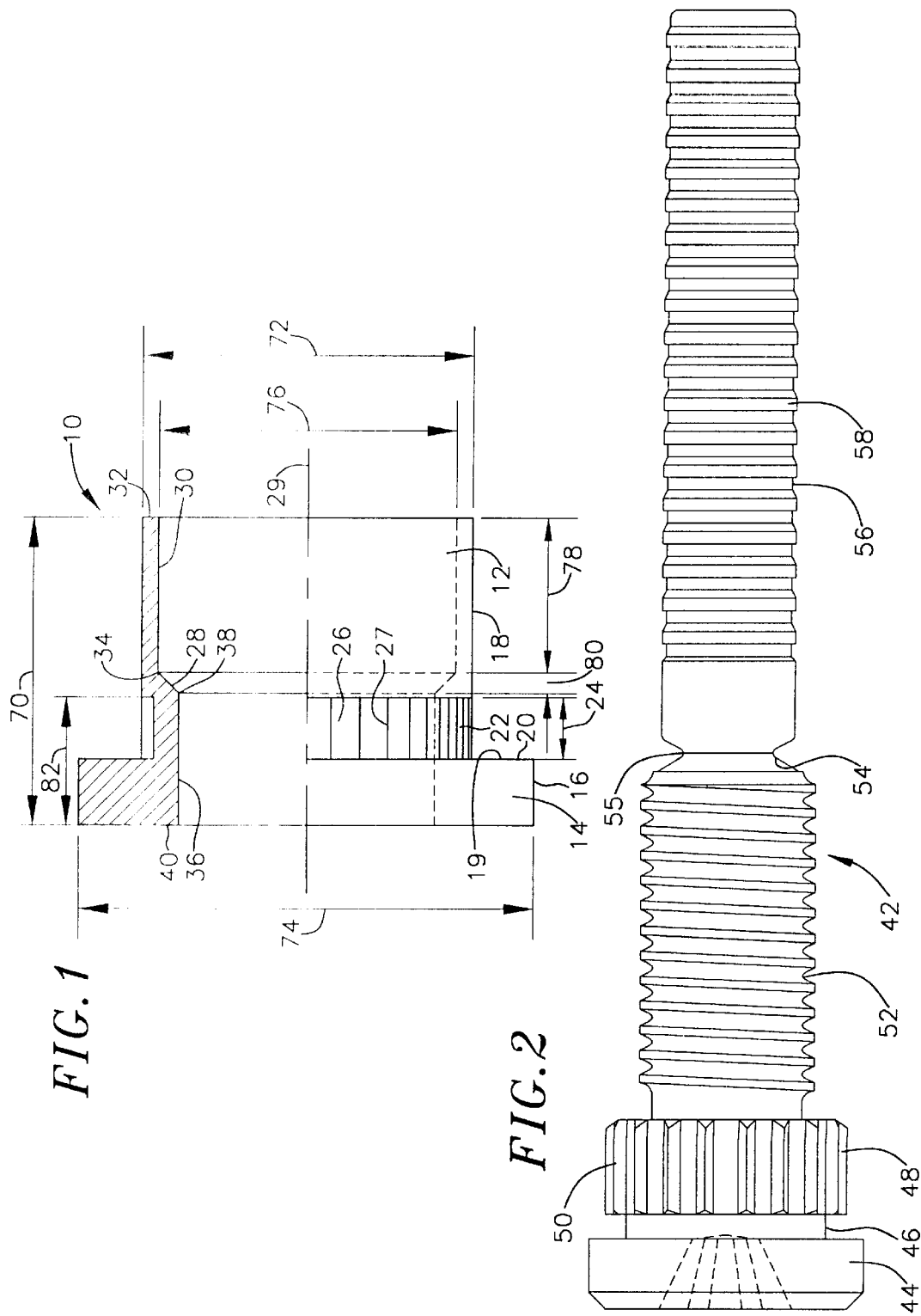

ELECTRICAL TERMINAL BLIND GROUNDING STUD FASTENER SYSTEM

FIELD OF THE INVENTION

The invention relates to fasteners and more specifically to electrical terminal blind grounding studs.

BACKGROUND OF THE INVENTION

Blind grounding studs are used throughout aircraft and protrude from the same side of the structure from which they are installed. They are referred as "blind" because they require access to only one side of the panel or structure for installation. A nut is typically threaded on the installed grounding stud and holds an electrical wire in contact with the stud.

The problem with conventional grounding studs is that they occasional slip relative to the structures through which they are installed. Slippage allows the grounding studs to rotate relative to the panels or structures. Slippage is more prevalent when the structures, such as panels, through which they are installed are relatively thin, i.e., they have a thickness of less than 0.050 inch. The rotation due to slippage can cause the loss of proper electrical conductivity between the sleeve of the stud and panel and ultimately to a wire held in contact with the stud which may result in electrical failures in the system which rely on such stud for grounding.

As such, a blind grounding stud is desired that can be locked in place in the panel or structure to which it is installed such that rotation of the stud relative to the panel is alleviated. The present invention provides such a blind stud.

SUMMARY OF THE INVENTION

A fastener system is provided comprising a blind grounding stud and an inventive sleeve. The sleeve has a first section abutting a second section. The first section has a smaller outer surface diameter than the second section. A knurled band is formed around the first section beginning at the intersection between the first and second sections. The sleeve has an opening axially through the two sections. The opening has a first larger inner diameter surface which tapers via a frusto-conical surface to a smaller diameter inner surface. The larger diameter inner surface extends from an end of the sleeve first section opposite the second section and extends toward the second section to the frusto-conical surface. The smaller diameter inner surface begins at an end of the second section opposite the first section and extends toward the first section to the frusto-conical inner surface. The smaller diameter inner surface spans at least a portion of, and preferably all of the knurled band.

The blind grounding stud is fitted through the sleeve opening from the first section. The stud comprises a head, a knurled portion extending from the head, a threaded portion extending from the knurled portion, a breakneck positioned at the end of the threaded portion and a grip portion comprising a plurality of ferrules extending from the breakneck. When fitted through the sleeve, the threaded portion and grip portion extend through the end of the sleeve second section.

DESCRIPTION OF THE DRAWINGS

FIG. 1 is a partial cross-sectional front view of the sleeve of the present invention.

FIG. 2 is a side view of a blind grounding stud used with the sleeve of FIG. 1.

DETAILED DESCRIPTION OF THE INVENTION

Figure 3:
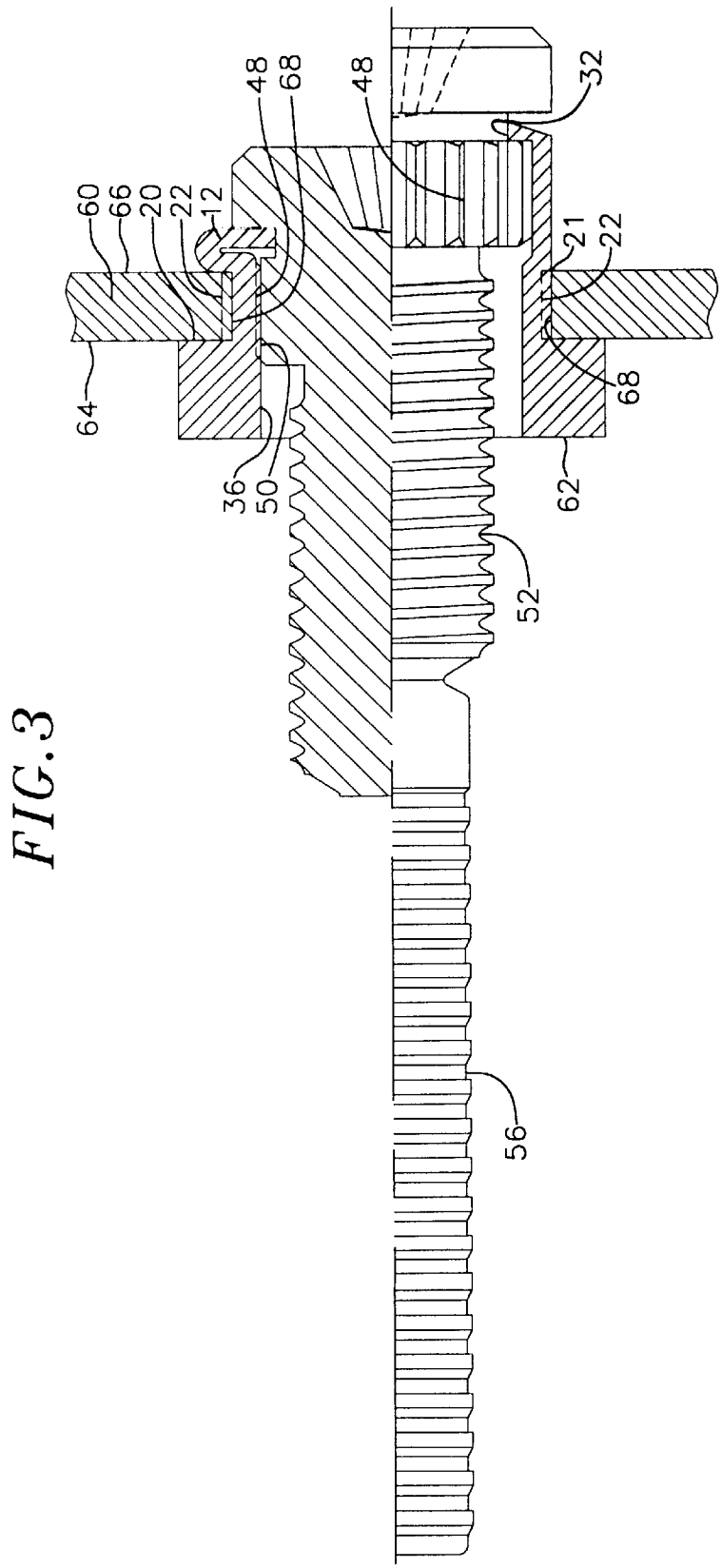
FIG. 3 depicts a section view of the blind stud of the present invention fitted through a panel and showing in cross-section on one side the sleeve collapsed to lockingly engage the panel with the grip portion removed after complete installation.

A fastener system including a blind grounding stud is provided comprising an inventive sleeve. The sleeve 10 has a first section 12 abutting a second section 14 (FIG. 1). Both sections have cylindrical outer surfaces. The second section cylindrical outer surface 16 has a diameter larger than the first section cylindrical outer surface 18. An annular shoulder 20 is defined by an outer edge surface 19 of the second section 14 which abuts and extends perpendicular to the first section 12. The outer surface diameter of the first sleeve section 12 is slightly smaller than the diameter of a hole 21 (FIG. 3) in a panel 60 (FIG. 3) in which the blind stud will be installed. The outer surface diameter of the second sleeve 14 section is larger than the diameter of the panel hole 21. The sleeve is typically machined from a single piece of material by any well known process.

For illustrative purposes the installation of the blind grounding stud (and sleeve) of the present invention is described in relation to a panel. However, the present invention blind stud can also be installed on other structures. As such, the term "panel" as used herein should be interpreted to include panels as well as other structures as for example, stringers or formers into which the blind stud of the present invention can be installed.

A knurled band 22 is formed on the outer surface of the first sleeve section 12 adjacent to the second sleeve section 14. The width 24 of the band should be as wide, and preferably wider than the thickness of the panel 60 in which the blind stud will be installed.

The knurled band comprises individual teeth 26 which are oriented axially along the sleeve. The teeth have sharp crested ridges 27. The teeth may be coated with diamond to increase their strength and toughness.

The sleeve inner surface is defined by two cylindrical inner surfaces coupled together via a frusto-conical inner surface 28. The two cylindrical inner surfaces and the frusto-conical inner surface are formed about the same central axis 29. A larger diameter cylindrical inner surface 30 extends from the free end 32 of the first sleeve section 12 and toward the second sleeve section to the annular end 34 of the frusto conical surface 28. The frusto-conical surface provides a taper from the larger diameter inner surface 30 to a smaller diameter inner surface 36. The taper of the frusto conical surface is preferably in the order of 45°.

The smaller diameter inner surface section begins the other annular end 38 of the frusto-conical surface and extends to a free end 40 of the second sleeve section. The smaller diameter inner surface 36 begins at a location within the sleeve first section 12 at a distance from the second section 14 that encompasses a portion of the knurled band 22 but which is preferably equal or slightly greater than the width of the knurled band 22.

As shown in FIG. 2, a stud 42 comprises a circular head 44 that has a diameter about equal to the outer surface diameter of the first sleeve section 12. A first portion 46 extends from the head having a diameter smaller than the diameter of the head. A second portion 48 extends from the first portion and has an knurled outer surface. The diameter of the knurled portion is larger than the diameter of the smaller inner surface of the sleeve 36 and smaller than the diameter of the larger inner surface 30 of the sleeve. The stud knurled outer surface comprises teeth 50 that are axially oriented relative to the stud. The diameter of the stud knurled portion is larger than the diameter of the stud first portion 46 but smaller than the diameter of the head 44.

A third threaded shaft portion 52 extends from the second portion. The third portion has a diameter smaller than the smaller inner surface diameter 36 of the sleeve. A fourth or "breakneck" portion 54 extends from the third portion 52. A fifth cylindrical shaft grip portion 56 extends from the breakneck portion. Parallel annular ferrules 58 are formed along the length of the grip portion to provide a surface to engage a tool during installation. The diameter of the fifth portion is greater than the diameter of the breakneck portion but smaller than the diameter threaded shaft portion. The breakneck portion 54 defines an annular notch 55 between the threaded shaft and grip portions. The annular notch provides a weak point on the stud.

The stud is fitted through the sleeve first section 12 and extends beyond the sleeve second section 14 until the head 44 of the stud abuts the free end 32 of the sleeve first section (FIG. 3). In a preferred embodiment, the free end 32 of the first sleeve section is crimped reducing its inner diameter to a diameter smaller than the diameter of the second knurled portion 48 of the stud, as shown in FIG. 3. In this regard, the sleeve is held in place between the stud head and the stud knurled section.

To install the blind grounding stud to a panel 60, a hole 21 is formed through the panel that has a diameter that is slightly larger than the outer diameter of the sleeve first section (FIG. 3). The grip, breakneck and threaded portions of the stud are fitted into an installation tool (not shown) such that the nose of the installation tool abuts against the second sleeve section end surface 62. The sleeve first section with abutting stud head are then fitted through the hole until the annular shoulder 20 defined by the sleeve second section rests on the panel front surface 64 surrounding the hole. A slight pressure is required to slide sleeve first section with the stud head through the hole in the panel and for the annular shoulder to make contact with the panel. When the annular shoulder makes contact with the panel, the sleeve first section with the abutting stud head are protruding beyond the rear surface 66 of the panel, while the knurled band portion 22 of the sleeve outer surface is radially aligned with the edge 68 of the hole.

The installation tool is then activated causing the tool to clamp on the annular ferrules of the stud grip portion 56 and simultaneously pull the stud so as to cause the stud to move relative to the sleeve which is being retained in position by the nose of the tool. Consequently, the head 44 of the stud pushes against the abutting sleeve first section end 12, causing the sleeve first section portion extending behind the rear surface 66 of the panel to collapse and expand radially behind the panel rear surface 66 causing the panel to be sandwiched between the sleeve annular shoulder 20 and the collapsed sleeve first section 12 (FIG. 3). As the gun continues to pull on the ferruled grip portion of the stud, the teeth 50 of the stud knurled portion dig into the frusto-conical inner surface and into the smaller diameter inner surface 36 of the of the sleeve physically locking the stud relative to the sleeve, thereby preventing rotation of the stud relative to the sleeve. The frusto-conical inner surface provides for a gradual increase in the thickness of the sleeve from the larger inner surface to the smaller inner surface. Consequently, the force required to cause the teeth 50 of the stud knurled portion 48 to dig into the sleeve is reduced. Simultaneously, the engagement sleeve smaller diameter inner surface 36 by the stud knurled portion teeth 50 causes the sleeve to expand. Because the knurled band 22 is located over the smaller diameter inner surface portion of the sleeve first section and immediately adjacent to the frusto-conical and larger diameter inner sections of the sleeve, the sleeve knurled band portion of the sleeve expands as the stud knurled portion 48 begins to dig into the smaller diameter inner surface 36 of the sleeve. When this occurs, teeth 26 of the knurled band formed on the outer surface of the sleeve dig into the edge 68 of the hole, physically locking the sleeve to the panel, and thereby preventing the rotation of the sleeve relative to the panel. As the installation the gun further pulls on the stud it breaks the stud at the weaker breakneck section causing the stud grip portion to separate from the stud threaded portion.

An exemplary embodiment of the blind grounding stud of the present invention consists of a sleeve having an overall length 70 of about 0.27 inch. The first sleeve section has an outer diameter 72 of about 0.31 inch. The second sleeve section has an outer diameter 74 of about 0.425 inch. The larger diameter inner surface 39 has a diameter 76 of about 0.29 inch and extends axially from the end of the first section to a distance 78 of about 0.145 inch toward the second section. The inner surface then tapers along a 45° angle forming a frusto-conical surface which spans an axial distance 80 of about 0.01 inch. The smaller inner surface diameter 36 has an axial length 82 of about 0.11 inch and extends from the end of the frusto conical surface to the end of the sleeve second section. The knurled 22 band formed on the outer surface of the sleeve first section has a width 24 of about 0.045 inch and abuts the sleeve second section. The knurled band on the outer surface of the first section comprises about 50 sharp teeth which are formed with a 53 pitch linear knurling tool.

Although the present invention has been described and illustrated to respect to multiple embodiments thereof, it is to be understood that it is not to be so limited, since changes and modifications may be made therein which are within the full intended scope of this invention as hereinafter claimed.

What is claimed is:

1. A fastener system comprising:
   a blind stud and a sleeve, the sleeve comprising,
      a first section having a cylindrical outer surface having a diameter,
      a second section extending from the first section having a cylindrical outer surface having a diameter greater than the diameter of the first section,
      an opening defined axially through the two sections, and
      a plurality of longitudinally extending and axially aligned teeth formed on the outer surface of the first section adjacent the second section; and
   the blind stud comprising,
      a head, and
      a shaft,
   wherein the shaft penetrates the sleeve opening from an end of the first section and extends beyond an end of the second section, wherein the head rests against the end of the first section.

2. The fastener system of claim 1 wherein the teeth comprise sharp crests.

3. The fastener system of claim 1 wherein the plurality of teeth are coated with diamond.

4. The fastener system of claim 1 wherein the plurality of teeth form a knurled band around the outer surface of the first section.

5. The fastener system of claim 1 wherein the opening of the sleeve comprises a first cylindrical inner surface and a second cylindrical inner surface, wherein the diameter of the first inner surface is greater than the diameter of the second inner surface.

6. The fastener system of claim 5 wherein the shaft of the blind stud comprises:
a knurled portion having a diameter greater than the second cylindrical inner surface diameter;
a threaded portion adjacent the knurled portion, said threaded portion having a diameter smaller than the second cylindrical inner surface diameter of the sleeve; and
a grip portion adjacent the threaded portion having a diameter smaller than the second cylindrical inner surface diameter.

7. The fastener of claim 6 wherein the shaft further comprises a reduced diameter portion defining an annular notch between the threaded and grip portions.

8. The fastener system of claim 6 wherein the second cylindrical inner surface begins at a free end of the sleeve second section and extends to a location within the sleeve first section.

9. The fastener system of claim 6 wherein the second cylindrical inner surface begins at a free end of the sleeve second section and extends to the sleeve first section spanning a width of a knurled band formed on an outer surface of the sleeve first section.

10. The fastener system of claim 9 wherein the shaft knurled portion comprises a plurality of teeth, each tooth having a longitudinal axis parallel to the shaft.

11. The fastener system of claim 6 wherein the grip portion comprises a plurality of annular ferrules.

12. The fastener system of claim 6 wherein the opening of the sleeve further comprises a frusto-conical inner surface bridging the first and second cylindrical inner surfaces.

13. The fastener system of claim 6 wherein a free end of the sleeve first section is crimped reducing the diameter of said free end to a diameter smaller than the diameter of the shaft knurled portion.

14. A sleeve for a blind stud comprising:
a first section having a cylindrical outer surface having a diameter;
a second section extending from the first section having a cylindrical outer surface having a diameter greater than the diameter of the first section;
an opening defined axially through the two sections; and
a plurality of longitudinally extending and axially aligned teeth formed on the outer surface of the first section adjacent the second section.

15. The sleeve of claim 14 wherein the teeth comprise sharp crests.

16. The sleeve of claim 14 wherein the teeth are coated with diamond.

17. The sleeve of claim 14 wherein the plurality of teeth form a knurled band around the outer surface of the first section.

18. The sleeve of claim 14 wherein the opening comprises a first cylindrical inner surface and a second cylindrical inner surface, wherein the diameter of the first inner surface is greater than the diameter of the second inner surface.

19. The sleeve of claim 18 wherein the second cylindrical inner surface begins at a free end of the sleeve second section and extends to a location within the sleeve first section.

20. The sleeve of claim 18 wherein the second cylindrical inner surface begins at a free end of the sleeve second section and extends to the sleeve first section spanning a width of a knurled band formed on an outer surface of the sleeve first section.

21. The sleeve of 18 wherein the opening further comprises a frusto-conical inner surface bridging the first and second cylindrical inner surfaces and providing an annular tapered surface for transitioning from the first cylindrical inner surface to the second cylindrical inner surface.

22. A fastener system for a panel comprising:
an electrical terminal blind grounding stud having a head portion and a knurled portion substantially adjacent the head portion,
a threaded portion adjacent the knurled portion,
a pull section adjacent the threaded portion and a breakneck positioned between the threaded portion and the pull section; and
a sleeve;
the sleeve having a first portion having an outer surface having a diameter;
a second portion adjacent the first portion having an outer surface having a diameter greater than the diameter of the first portion; and
a plurality of longitudinally oriented axial teeth formed on the outer surface of the first portion adjacent the second portion;
the sleeve further having a bore extending through the first and second portions wherein the bore has a first cylindrical diameter extending from the first portion which transitions by an angled surface into a second cylindrical diameter which terminates at the second portion;
wherein the stud extends through the bore such that the head portion is adjacent the first portion of the sleeve and the threaded portion extends beyond the second portion of the sleeve and when the stud is drawn through the sleeve the knurled portion of the sleeve engages the angled surface of the sleeve thereby expanding the sleeve so that the stud is locked to the sleeve and forces the teeth on the outer surface of the first portion of the sleeve to engage the panel and lock the sleeve to the panel.

* * * * *

UNITED STATES PATENT AND TRADEMARK OFFICE
CERTIFICATE OF CORRECTION

PATENT NO. : 6,186,717 B1 Page 1 of 1
DATED : February 13, 2001
INVENTOR(S) : Frank J. Cosenza It is certified that error appears in the above-identified patent and that said Letters Patent is hereby corrected as shown below:

<u>Column 6,</u>
Line 16, after "sleeve of" insert -- claim --.
Line 28, replace "pull" with -- pulled --.

Signed and Sealed this

Twenty-fifth Day of June, 2002

*Attest:*

*Attesting Officer*

JAMES E. ROGAN
*Director of the United States Patent and Trademark Office*